United States Patent
Kumamoto

(10) Patent No.: US 10,090,541 B2
(45) Date of Patent: Oct. 2, 2018

(54) REDOX FLOW BATTERY

(71) Applicant: Sumitomo Electric Industries, Ltd., Osaka-shi, Osaka (JP)

(72) Inventor: Takahiro Kumamoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 295 days.

(21) Appl. No.: 14/366,229

(22) PCT Filed: Sep. 18, 2012

(86) PCT No.: PCT/JP2012/073818
§ 371 (c)(1),
(2) Date: Jun. 17, 2014

(87) PCT Pub. No.: WO2014/045337
PCT Pub. Date: Mar. 27, 2014

(65) Prior Publication Data
US 2014/0363753 A1    Dec. 11, 2014

(51) Int. Cl.
*H01M 8/04*    (2016.01)
*H01M 8/04276*    (2016.01)
*H01M 8/18*    (2006.01)
*H01M 8/20*    (2006.01)

(52) U.S. Cl.
CPC ....... *H01M 8/04276* (2013.01); *H01M 8/188* (2013.01); *H01M 8/20* (2013.01); *Y02E 60/528* (2013.01)

(58) Field of Classification Search
CPC .... H01M 8/188; H01M 8/20; H01M 8/04186; H01M 8/04276
See application file for complete search history.

(56) References Cited

U.S. PATENT DOCUMENTS

| 4,053,684 A | * | 10/1977 | Zito, Jr. | ............ H01M 8/04186 429/450 |
| 2009/0297371 A1 | * | 12/2009 | Rei | ......................... F04B 19/24 417/379 |
| 2011/0244277 A1 | | 10/2011 | Gordon, II et al. | |
| 2011/0294024 A1 | * | 12/2011 | Harbusch | .......... H01M 8/04201 429/413 |

FOREIGN PATENT DOCUMENTS

CN    20319294 U    9/2013
CN    203192914 U    9/2013
(Continued)

OTHER PUBLICATIONS

International Search Report for corresponding International Application PCT/JP2012/073818, dated Nov. 6, 2012, 1 page.
(Continued)

*Primary Examiner* — Jimmy Vo
(74) *Attorney, Agent, or Firm* — Ditthavong & Steiner, P.C.

(57) ABSTRACT

An RF battery in which an amount of leakage of an electrolyte in a tank can be reduced by means of a leakage prevention hole provided on the upper side of the tank, at the time of an accident to an upstream pipe and the like, through an inverted U-shaped pipe formed of an accommodated pipe and a portion of the upstream pipe according to the principle of a siphon.

6 Claims, 3 Drawing Sheets

(56) References Cited

FOREIGN PATENT DOCUMENTS

| JP | 62-31371 U | 2/1987 | | |
|----|------------|--------|---|---|
| JP | 62035461 A | 2/1987 | | |
| JP | 62086667 A | 4/1987 | | |
| JP | 2195657 A | 8/1990 | | |
| JP | 04-124755 U | 11/1992 | | |
| JP | 2001043884 A | 2/2001 | | |
| JP | 2001102079 A | 4/2001 | | |
| JP | 2002025599 A | 1/2002 | | |
| JP | 2004162735 A | 6/2004 | | |
| WO | WO-2010066900 A1 * | 6/2010 | ........ | H01M 8/04201 |
| WO | 2010138949 A2 | 12/2010 | | |

OTHER PUBLICATIONS

Extended European Search Report of PCT/JP2012073818, dated Apr. 20, 2016, 8 pages.

Office Action for corresponding Chinese Patent Application No. 201210402320.0 dated Jun. 2, 2016, 10 Pages.

\* cited by examiner

REDOX FLOW BATTERY

TECHNICAL FIELD

The present invention relates to redox flow batteries (hereinafter also referred to as "RF batteries"). More particularly, the present invention relates to an RF battery in which an amount of leakage of an electrolyte in a tank can be reduced at the time of an accident and the like.

BACKGROUND ART

As a way to combat global warming, introduction of new energy such as solar photovoltaic power generation and wind power generation has been promoted in recent years throughout the world. Since outputs of these power generations are affected by the weather, it is predicted that introduction on a large scale will cause problems with operation of power systems such as difficulty in maintaining frequencies and voltages. As a way to address such problems, installation of large-capacity storage batteries for smoothing output variations, storing surplus power, and load leveling is expected.

An RE battery is one of large-capacity storage batteries. FIG. 6 shows the form of a conventional RF battery disclosed in Patent Document 1 (Japanese Patent Laying-Open No. 2001-43884). As shown in FIG. 6, a conventional RF battery 100 includes a battery element 100c with a membrane 101 interposed between a positive electrode cell 102 having a positive electrode 104 therein and a negative electrode cell 103 having a negative electrode 105 therein, and a circulation mechanism (tanks 106, 107; upstream pipes 108, 109; downstream pipes 110, 111; pumps 112, 113). RF battery 100 can be charged and discharged by means of the circulation mechanism to supply a positive electrode electrolyte and a negative electrode electrolyte to battery element 100c by circulation. An aqueous solution containing a metal ion such as a vanadium ion having a valence which changes by oxidation-reduction is typically used as the electrolytes. The ions in tanks 106 and 107 in FIG. 6 are for illustrative purposes only. In FIG. 6, solid line arrows indicate charge, and broken line arrows indicate discharge.

In conventional RF battery 100, upstream pipes 108 and 109 for supplying the positive and negative electrode electrolytes to battery element 100c have one ends attached to the bottom sides (lower sides) of tanks 106 and 107, respectively, and the other ends attached to the bottom side (lower side) of battery element 100c. Furthermore, in conventional RF battery 100, downstream pipes 110 and 111 for returning the electrolytes from battery element 100c to tanks 106 and 107 of both electrodes are attached to the upper sides of tanks 106 and 107, respectively.

CITATION LIST

Patent Document

PTD 1: Japanese Patent Laying-Open No. 2001-43884

SUMMARY OF INVENTION

Technical Problem

Unfortunately, if an accident occurs such as breakage of upstream pipes 108, 109 and/or pumps 112, 113 in conventional RF battery 100, most of the electrolytes in tanks 106 and 107 of the positive and negative electrodes are leaked.

Since the electrolytes used in the RF battery are deleterious substances such as a sulfuric acid solution, the leakage of large amounts of them may compromise the safety of operators, affect the environment, and contaminate the surrounding equipment.

In addition, since the electrolytes used in the RF battery are electrically conductive, a ground fault may occur, or a short circuit may occur between the positive electrode cell and the negative electrode cell, and between the RF battery and the surrounding equipment. Similar problems may arise when one ends of the downstream pipes are attached to the lower sides of the tanks.

Thus, there exists a need to minimize the amount of electrolytes leaked from the tanks even in the event of an accident such as breakage of the pipes and/or pumps of the RF battery.

Therefore, an object of the present invention is to provide a redox flow battery in which an amount of leakage of an electrolyte in a tank can be reduced at the time of an accident and the like.

Solution to Problem

To solve the problems described above, a removal port for the electrolyte in each tank may be provided, for example, on the liquid level side of the electrolyte in the tank, namely, on the upper side of the tank, to supply the electrolyte in the tank to the battery element.

According to this form, even in the event of an accident such as described above, the electrolyte leaked to the outside of the tank can be limited to a portion of the electrolyte above the removal port in the tank. In this form, the leakage amount of the electrolyte in the tank can be limited by the position where the removal port for the electrolyte in the tank is provided. Thus, it can be said that the leakage amount of the electrolyte from the tank can be further reduced as the position of the removal port for the electrolyte in the tank is higher from the bottom of the tank, in other words, closer to the liquid level of the electrolyte in the tank.

However, if the removal port for the electrolyte is provided on the upper side of the tank and the downstream pipe is attached to the upper side of the tank, the electrolyte that has been returned to the upper side of the tank through the downstream pipe will be immediately supplied to the battery element through the removal port provided on the upper side of the tank. As such, the electrolyte is not sufficiently convected in the tank, and only a portion of the electrolyte in the tank (electrolyte near the liquid level of the tank) is mainly utilized, which may result in a portion of the electrolyte not substantially utilized for charge and discharge. Such decrease in rate of utilization of the electrolyte lowers the performance of the RF battery.

Accordingly, the present inventors conducted a study to provide the removal port on the liquid level side of the electrolyte in the tank, and to provide a pipe in the tank in such a manner that not only the electrolyte in the vicinity of the removal port but also the electrolyte on the bottom side of the tank can be removed.

If a portion of each of upstream pipes 108, 109 and pumps 112, 113 are supported on a floor surface and the like as with conventional RF battery 100 shown in FIG. 6, for example, a support member such as a mount can be eliminated, and upstream pipes 108, 109 and pumps 112, 113 can be readily maintained.

Accordingly, the present inventors studied a form in which a pipe is accommodated in the tank, and a portion of the upstream pipe and the pump are provided on the bottom side of the electrolyte in the tank. In this form, one end of the pipe accommodated in the tank opens at the bottom side of the tank, while a portion of the upstream pipe is provided at a position higher than the opening of the pipe accommodated in the tank, and another portion of the upstream pipe is provided at a position lower than the liquid level of the electrolyte in the tank.

In this form, therefore, the pipe accommodated in the tank and a portion of the upstream pipe form an inverted U-shape. Thus, the electrolyte in the tank may be leaked to the outside of the tank, by an accident such as described above, through the inverted U-shaped portion according to the principle of a siphon.

The present inventors also studied a form in which the pipe accommodated in the tank is connected to the downstream pipe to return the electrolyte from the battery element to the bottom side of the tank. Specifically, a return port for the electrolyte (opening of the downstream pipe) is provided on the upper side of the tank, the pipe accommodated in the tank is connected to this return port, and the pipe accommodated in the tank is opened at the bottom side of the tank. If the removal port for the electrolyte in the tank is provided on the upper side of the tank in this form, the rate of utilization of the electrolyte in the tank can be increased.

In this form, too, however, if the pump and the like are supported on a floor surface and the like as described above, a portion of the upstream pipe is provided at a position lower than the liquid level of the electrolyte in the tank. In this form, therefore, the pipe accommodated in the tank and a portion of the upstream pipe are provided to form an inverted U-shape with the battery element interposed therebetween. As a result, in this form, too, the electrolyte in the tank may be leaked to the outside of the tank, by an accident such as described above, through the inverted U-shaped portion according to the principle of a siphon.

After reviewing these points, the present invention proposes to (1) open the upstream pipe or downstream pipe at the liquid level side of the electrolyte in the tank, (2) provide a pipe in the tank, (3) open the pipe in the tank at the bottom side of the tank and connect the pipe in the tank to the upstream pipe or the downstream pipe, and (4) provide a through hole in a particular position of the pipe in the tank.

An RF battery according to the present invention is charged and discharged by supply of an electrolyte in a tank to a battery element, and includes an upstream pipe for supplying the electrolyte in the tank to the battery element, and a downstream pipe for returning the electrolyte from the battery element to the tank. A portion of an electrolyte flow path formed of the upstream pipe, the battery element and the downstream pipe is a low position portion provided at a position lower than a liquid level of the electrolyte in the tank. The RF battery according to the present invention further includes an accommodated pipe provided in the tank and connected to the upstream pipe or the downstream pipe. One end of the upstream pipe or the downstream pipe connected to one end of the accommodated pipe opens at a position close to the liquid level or at space above the liquid level of the electrolyte in the tank. The other end of the accommodated pipe opens at a position close to the bottom of the tank. The accommodated pipe is provided with a leakage prevention hole at a position close to the liquid level of the electrolyte in the tank. The leakage prevention hole is smaller than an opening at the other end of the accommodated pipe.

It is noted that "a position close to a liquid level" as used herein refers to a position greater than (L/2) and less than L from the bottom of a tank, when the distance from the bottom of the tank to the liquid level of an electrolyte in the tank is represented as L, in a state where an accident such as described above has not occurred. It is noted that "a position close to the bottom" as used herein refers to a position equal to or less than (L/2) from the bottom of the tank.

In the RF battery according to the present invention, if the accommodated pipe is connected to the upstream pipe, a removal port for the electrolyte in the tank (opening at the one end of the upstream pipe) is provided at a position close to the liquid level or above the liquid level of the electrolyte in the tank, namely, on the upper side of the tank, to supply the electrolyte through the removal port to the battery element.

In the RF battery according to the present invention, if the accommodated pipe is connected to the downstream pipe, a return port for the electrolyte (opening at the one end of the downstream pipe) is provided on the upper side of the tank, to return the electrolyte from the battery element through the return port to the tank.

The RF battery according to the present invention includes the accommodated pipe in the tank, which opens close to the bottom of the tank, and includes the low position portion provided at a position lower than the liquid level of the electrolyte in the tank. In the RF battery according to the present invention having the above structure, the accommodated pipe and a portion (portion including the low position portion) of the electrolyte flow path provided outside of the tank form an upwardly convex shape (e.g., inverted U-shape, inverted V-shape, or the shape of Π) when connected together. As such, the RF battery according to the present invention includes an upwardly convex shape in the path through which the electrolyte passes.

In the RF battery according to the present invention, therefore, in the event of an accident such as breakage of the upstream pipe and downstream pipe connecting the accommodated pipe to the battery element, or breakage of the pump provided on the upstream pipe and the like, the electrolyte in the tank is moved to the outside of the tank through the accommodated pipe, by means of the upwardly convex portion according to the principle of a siphon. In the RF battery according to the present invention, however, the accommodated pipe has the leakage prevention hole at a position close to the liquid level of the electrolyte in the tank, namely, on the upper side of the tank, thereby limiting the electrolyte leaked to the outside from the tank to the amount of the electrolyte above the leakage prevention hole in the tank.

Accordingly, in the RF battery according to the present invention, the electrolyte on the bottom side of the tank can be removed and the electrolyte can be returned to the bottom side of the tank. In addition, the leakage amount of the electrolyte in the tank can be reduced at the time of an accident such as described above.

In the RF battery according to the present invention, since the size of the leakage prevention hole is smaller than the size of the opening of the accommodated pipe provided at the bottom side of the tank, a loss of the pump can be reduced when supplying the electrolyte to the battery element by circulation.

In the RF battery according to the present invention, the removal port or return port for the electrolyte in the tank opens at the upper side of the tank as described above, and the other end of the accommodated pipe for actually sucking the electrolyte in the tank or the other end of the accommodated pipe for actually discharging the electrolyte into the tank opens at a position close to the bottom of the tank, namely, on the lower side of the tank. With this structure, the RF battery according to the present invention can utilize the electrolyte at a position away from the removal port or return port for the electrolyte in the tank, thereby increasing the rate of utilization of the electrolyte in the tank.

In one embodiment of the RF battery according to the present invention, the one end of the accommodated pipe may be connected to the upstream pipe, and the upstream pipe may be provided with the low position portion in a portion thereof. In one embodiment of the RF battery according to the present invention, the one end of the accommodated pipe may be connected to the downstream pipe, and the upstream pipe may be provided with the low position portion in a portion thereof.

Both of the above two embodiments have an upwardly convex shape such as an inverted U-shape, which is formed of the accommodated pipe and the low position portion provided on the upstream pipe when connected together. In both of the above two embodiments, however, the leakage amount of the electrolyte in the tank can be limited by the leakage prevention hole.

In the embodiment where the one end of the accommodated pipe is connected to the upstream pipe, the one end of the downstream pipe may open at a position close to the liquid level or at space above the liquid level of the electrolyte in the tank. In the embodiment where the accommodated pipe is connected to the downstream pipe, the one end of the upstream pipe may open at a position close to the liquid level or at space above the liquid level of the electrolyte in the tank, and the upstream pipe may be connected to another accommodated pipe which opens into the electrolyte in the tank.

In the former of the above two embodiments, the electrolyte that has been returned to the upper side of the tank from the battery element can be supplied from the bottom side (lower side) of the tank to the battery element through the accommodated pipe connected to the upstream pipe. In the latter embodiment, the electrolyte that has been returned to the bottom side (lower side) of the tank through the accommodated pipe connected to the downstream pipe can be supplied from the upper side of the tank to the battery element. As such, the electrolyte can be sufficiently convected in the tank in both of the above embodiments, thereby sufficiently utilizing the entire electrolyte in the tank to increase the rate of utilization of the electrolyte in the tank.

In one embodiment of the RF battery according to the present invention, when a diameter of the leakage prevention hole is represented as $\phi h$, and a diameter of the opening at the other end of the accommodated pipe is represented as $\phi i$, diameter $\phi h$ of the leakage prevention hole is not less than 1 mm and less than ($\phi i/2$). In this embodiment, the leakage amount of the electrolyte in the tank can be limited by the specific size of the leakage prevention hole at the time of an accident such as described above, thereby reducing a loss of the pump when supplying the electrolyte in the tank to the battery element during charge and discharge.

Advantageous Effects of Invention

In the RF battery according to the present invention, the leakage amount of the electrolyte in the tank can be reduced at the time of an accident and the like.

DESCRIPTION OF EMBODIMENTS

Figure 1:
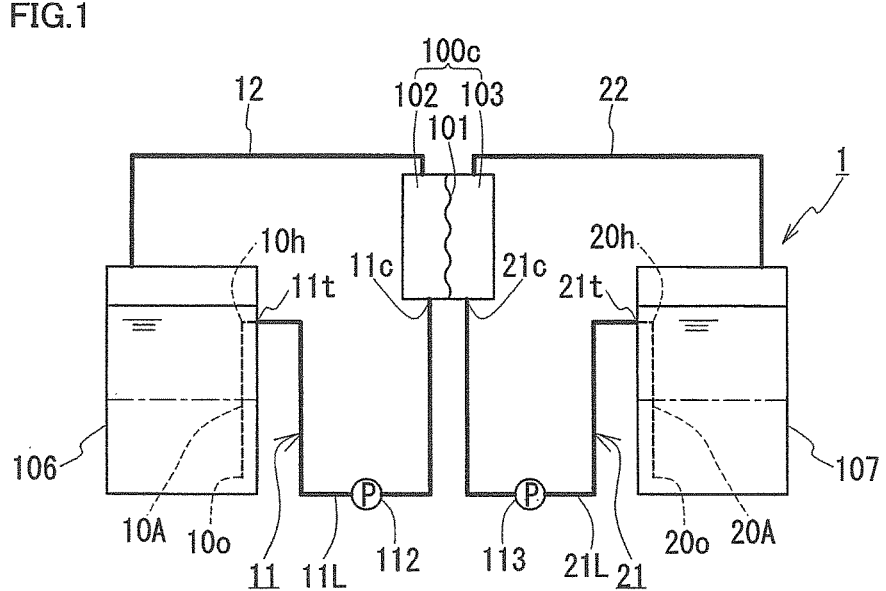
FIG. 1 is a schematic structural diagram of an RF battery in a first embodiment.

Embodiments of the present invention will be hereinafter described. The same reference signs indicate the same or corresponding elements in the drawings of the present invention.

First Embodiment

FIG. 1 is a schematic structural diagram of an RF battery in a first embodiment. A pipe arrangement on the positive electrode side and a pipe arrangement on the negative electrode side are identical to each other in an RF battery 1 in the first embodiment. Thus, the pipe arrangement on the positive electrode side will be mainly described by way of example.

RF battery 1 in the first embodiment shown in FIG. 1 includes a battery element 100c, and a circulation mechanism for supplying a positive electrode electrolyte and a negative electrode electrolyte to battery element 100c by circulation (e.g., a positive electrode tank 106; a negative electrode tank 107; a positive electrode upstream pipe 11; a positive electrode downstream pipe 12; a negative electrode upstream pipe 21; a negative electrode downstream pipe 22; pumps 112, 113). RF battery 1 is connected via an AC/DC converter to a power generation unit (e.g., a solar photovoltaic power generator, a wind power generator, or a common power plant) and to a load such as a power system or a consumer, and is charged with the power generation unit as a power supply source and discharged with the load as an object of power supply.

Battery element 100c may be formed of, for example, a cell stack including a stack of positive electrode cell 102 having a positive electrode, a negative electrode cell 103 having a negative electrode, and a membrane 101 provided between positive electrode cell 102 and negative electrode cell 103. Positive electrode cell 102 and negative electrode cell 103 may be formed of a cell frame, for example. The cell frame has a frame body provided around the periphery of a bipolar plate, the bipolar plate having a positive electrode on one surface thereof and a negative electrode on the other surface thereof, and a liquid supply hole for supplying the electrolytes and a liquid discharge hole for discharging the electrolytes. By stacking a plurality of cell frames, the liquid supply holes and liquid discharge holes form a flow path for the electrolytes. The cell stack is formed by successively stacking a cell frame, positive electrode cell 102, membrane 101, negative electrode 103, a cell frame . . . .

The positive electrode and negative electrode may be made of carbon felt, for example. Membrane 101 may be made of an ion exchange film such as a cation exchange film or anion exchange film. The bipolar plate may be made of plastic carbon, for example. The frame body of the cell frame may be made of resin such as vinyl chloride.

As the positive electrode electrolyte contained in positive electrode tank 106 and the negative electrode electrolyte contained in negative electrode tank 107, a solution containing a metal ion acting as an active material may be used, for example. Examples of a pair of metal ions utilized as the active materials of the positive and negative electrodes include: positive electrode: iron ion, negative electrode: chromium ion; positive electrode: vanadium ion, negative electrode: vanadium ion; and positive electrode: manganese ion, negative electrode: at least one species of metal ion selected from the group consisting of titanium ion, vanadium ion, chromium ion, zinc ion, and tin ion. When a manganese ion is used as the positive electrode active material, the RF battery can preferably have, depending on the negative electrode active material, a higher electromotive force than that of an all-vanadium RF battery utilizing a vanadium ion as the active materials of both positive and negative electrodes. When a manganese ion and a titanium ion are contained as the positive electrode active materials, deposition of $MnO_2$ by disproportionation reaction of $Mn^{3+}$ can be preferably suppressed. In this case, a manganese ion and a titanium ion may be contained as the active materials of both positive and negative electrodes.

As the positive electrode electrolyte and negative electrode electrolyte, it is preferable to use an aqueous solution containing at least one of sulfuric acid, phosphoric acid, nitric acid, sulfate, phosphate, and nitrate. It is particularly preferable to use a solution containing sulfate anion ($SnO_4^{2-}$) in terms of ease of use as an electrolyte.

Positive electrode cell 102 of battery element 100c and positive electrode tank 106 are connected together by positive electrode upstream pipe 11 and positive electrode downstream pipe 12 that form a part of a flow path for the positive electrode electrolyte. Negative electrode cell 103 of battery element 100c and negative electrode tank 107 are connected together by negative electrode upstream pipe 21 and negative electrode downstream pipe 22 that form a part of a flow path for the negative electrode electrolyte. Positive electrode upstream pipe 11 is provided with pump 112, and negative electrode upstream pipe 21 is provided with pump 113.

The positive electrode electrolyte from positive electrode tank 106 is supplied through positive electrode upstream pipe 11 to positive electrode cell 102 of battery element 100c, and is returned through positive electrode downstream pipe 12 to positive electrode tank 106. The negative electrode electrolyte from negative electrode tank 107 is supplied through negative electrode upstream pipe 21 to negative electrode cell 103 of battery element 100c, and is returned through negative electrode downstream pipe 22 to negative electrode tank 107.

RF battery 1 utilizes the circulation mechanism as described above to transfer the positive electrode electrolyte and negative electrode electrolyte to battery element 100c by pressure, and is charged and discharged by valence change reaction of the metal ions serving as active materials in the positive electrode electrolyte and negative electrode electrolyte.

One end of positive electrode upstream pipe 11 attached to positive electrode tank 106 and battery element 100c for supplying the positive electrode electrolyte in positive electrode tank 106 to battery element 100c, namely, an opening 11t to positive electrode tank 106, opens at a position close to a liquid level of the positive electrode electrolyte in positive electrode tank 106 (position greater than (L/2) and less than L from the bottom of positive electrode tank 106, when the distance from the bottom of positive electrode tank 106 to the liquid level of the positive electrode electrolyte in positive electrode tank 106 is represented as L). It is to be noted that an amount of the positive electrode electrolyte leaked from positive electrode tank 106 can be further reduced as the position of opening 11t of positive electrode upstream pipe 11 is farther away from the bottom of positive electrode tank 106. Thus, opening 11t is preferably provided at a position equal to or greater than (2L/3) away from the bottom of positive electrode tank 106, and is more preferably provided at a position equal to or greater than (3L/4) away from the bottom of positive electrode tank 106. In FIGS. 1 to 5, a solid line in positive electrode tank 106 and negative electrode tank 107 indicates the liquid level, and a chain-dotted line indicates the position of (L/2) from the bottoms of positive electrode tank 106 and negative electrode tank 107.

In RF battery 1, battery element 100c is supported by a not-shown mount, for example, at a position higher than the liquid level of the positive electrode electrolyte in positive electrode tank 106 and the negative electrode electrolyte in negative electrode tank 107. With this structure, during a period such as when operation of charging and discharging RF battery 1 is suspended, the electrolytes in battery element 100c can be completely removed. In RF battery 1, therefore, self-discharge due to the remaining electrolytes in battery element 100c can be reduced to suppress a decrease in discharged capacity.

One end of positive electrode upstream pipe 11 is opening 11t to positive electrode tank 106, which is provided at a position close to the liquid level of the positive electrode electrolyte in the positive electrode tank, and the other end of positive electrode upstream pipe 11 is an opening 11c to battery element 100c, which is an opening connected to the battery element. Since battery element 100c is provided above positive electrode tank 106, opening 11c is provided above positive electrode tank 106, toward battery element 100c provided above positive electrode tank 106. An intermediate portion of positive electrode upstream pipe 11 is provided with a low position portion 11L, which is a portion of positive electrode upstream pipe 11 provided at a position lower than the liquid level of the positive electrode electrolyte in positive electrode tank 106. Accordingly, positive electrode upstream pipe 11 is bent into a U-shape in such a manner that the intermediate portion of positive electrode upstream pipe 11 is lower than opening 11t and opening 11c at both ends of positive electrode upstream pipe 11, and this U-shaped portion includes low position portion 11L.

Pump 112 is mounted on linear low position portion 11L located at the lowest position of positive electrode upstream pipe 11. Linear low position portion 11L and pump 112 are supported on a floor surface (mounting surface), as with positive electrode tank 106. The position where pump 112 is provided in a longitudinal direction of positive electrode upstream pipe 11 can be selected as appropriate, and may thus be a position other than the above-described position.

An accommodated pipe 10A is provided in positive electrode tank 106. Accommodated pipe 10A is at least partially immersed in the positive electrode electrolyte in positive electrode tank 106 (accommodated pipe 10A is completely immersed in the positive electrode electrolyte in positive electrode tank 106 in the example shown in FIG. 1). Thus, accommodated pipe 10A is preferably made of a material that does not react with the positive electrode electrolyte in positive electrode tank 106. For example, polyvinyl chloride (PVC), polyethylene (PE), polypropylene (PP), or polytetrafluoroethylene (PTFE) may be used. The material for accommodated pipe 10A can also be applied to positive electrode upstream pipe 11, positive electrode downstream pipe 12, negative electrode upstream pipe 21 and negative electrode downstream pipe 22.

An opening at one end of accommodated pipe 10A is connected to opening 11t to the positive electrode tank of positive electrode upstream pipe 11. That is, the opening at the one end of accommodated pipe 10A (opening to the upstream pipe) is provided at a position close to the liquid level of the positive electrode electrolyte in positive electrode tank 106 (position greater than (L/2) and less than L from the bottom of positive electrode tank 106, when the distance from the bottom of positive electrode tank 106 to the liquid level of the positive electrode electrolyte in positive electrode tank 106 is represented as L). As described above, opening 11t is preferably provided at a position equal to or greater than (2L/3) away from the bottom of positive electrode tank 106, and is more preferably provided at a position equal to or greater than (3L/4) away from the bottom of positive electrode tank 106.

Accommodated pipe 10A and positive electrode upstream pipe 11 may be independent pipes that are connected together by an arbitrary connection, or may be a single continuous pipe. The same applies to embodiments described later.

An opening 10o at the other end of accommodated pipe 10A is provided at a position close to the bottom of the positive electrode electrolyte in positive electrode tank 106 (position equal to or less than (L/2) from the bottom of positive electrode tank 106, when the distance from the bottom of positive electrode tank 106 to the liquid level of the positive electrode electrolyte in positive electrode tank 106 is represented as L). As bottom-side opening 10o of accommodated pipe 10A becomes closer to the bottom of positive electrode tank 106, the distance between opening 10o and the liquid level of the positive electrode electrolyte in positive electrode tank 106 increases, thus allowing the positive electrode electrolyte at a position away from the liquid level of the positive electrode electrolyte to be supplied to battery element 100c. Particularly, if opening 11t to the positive electrode tank of positive electrode upstream pipe 11 and the opening to the upstream pipe of accommodated pipe 10A are provided in space above the liquid level of the positive electrode electrolyte in positive electrode tank 106, the positive electrode electrolyte that has been returned into positive electrode tank 106 from battery element 100c can be sufficiently convected before being removed from the bottom of positive electrode tank 106. As a result, in RF battery 1 in the first embodiment, the positive electrode electrolyte in positive electrode tank 106 tends to be in a uniform state, thus allowing the positive electrode electrolyte in a uniform state to be supplied to battery element 100c. Therefore, opening 10o at the other end of accommodated pipe 10A is preferably provided with a small distance from the bottom of positive electrode tank 106 (close to the bottom of positive electrode tank 106), is preferably provided at a position equal to or less than (L/3) away from the bottom of positive electrode tank 106, is more preferably provided at a position equal to or less than (L/4) away from the bottom of positive electrode tank 106, and is particularly preferably provided in the vicinity of the bottom of positive electrode tank 106.

Since the ends of accommodated pipe 10A are provided apart from each other in an upper portion and a lower portion within positive electrode tank 106 as described above, accommodated pipe 10A has an inverted L shape, which is the shape of an L turned upside down. Accommodated pipe 10A in an inverted L-shape and a portion (portion until a starting point of the linear portion of low position portion 11L) of positive electrode upstream pipe 11 form an inverted U-shaped pipe.

Furthermore, accommodated pipe 10A is provided with a leakage prevention hole 10h at a position close to the liquid level of the positive electrode electrolyte in positive electrode tank 106 (position greater than (L/2) and less than L from the bottom of positive electrode tank 106, when the distance from the bottom of positive electrode tank 106 to the liquid level of the positive electrode electrolyte in positive electrode tank 106 is represented as L). The leakage amount of the positive electrode electrolyte in positive electrode tank 106 can be further reduced as the position of leakage prevention hole 10h is farther away from the bottom of positive electrode tank 106. Thus, leakage prevention hole 10h is preferably at a position farthest away from the bottom of positive electrode tank 106 in the positive electrode electrolyte in positive electrode tank 106. In RF battery 1 in the first embodiment, leakage prevention hole 10h is provided in a corner portion (highest position) of accommodated pipe 10A in an inverted L-shape.

The size (cross-sectional area) and cross-sectional shape of accommodated pipe 10A may be selected as appropriate. For example, accommodated pipe 10A may have a constant cross-sectional shape along the entire length thereof, or may include a portion having a different cross-sectional shape or cross-sectional area in a portion of a longitudinal direction thereof. Accommodated pipe 10A may have a circular or rectangular cross-sectional shape, for example, and preferably has a circular cross-sectional shape so as to reduce flow resistance of the positive electrode electrolyte. In RF battery 1 in the first embodiment, accommodated pipe 10A has a constant, circular cross-sectional shape along the entire length thereof.

The size (cross-sectional area) and cross-sectional shape of leakage prevention hole 10h may be selected as appropriate. Leakage prevention hole 10h may have a circular, rectangular, polygonal other than rectangular, or elliptical cross-sectional shape, for example. The size (cross-sectional area) of leakage prevention hole 10h is smaller than the size (cross-sectional area) of opening 10o of accommodated pipe 10A.

If opening 10o and leakage prevention hole 10h of accommodated pipe 10A have circular cross-sectional shapes, a diameter $\phi h$ of leakage prevention hole 10h is smaller than a diameter $\phi i$ of accommodated pipe 10A ($\phi h < \phi i$). In particular, leakage prevention hole 10h having a diameter $\phi h$ of not less than 1 mm and less than ($\phi i/2$), particularly about not less than 2 mm and not more than 10 mm, can be readily used. In RF battery 1 in the first embodiment, leakage prevention hole 10h has a diameter $\phi h$ of not less than 1 mm and less than ($\phi i/2$).

Positive electrode downstream pipe 12 has at one end thereof an opening which opens at space above the positive electrode electrolyte in positive electrode tank 106, and has the other end connected to battery element 100c. The position of the opening at the one end of positive electrode downstream pipe 12 can be set as appropriate, and can be located at a position close to the liquid level of the positive electrode electrolyte in positive electrode tank 106, or at a position close to the bottom of positive electrode tank 106.

A pipe arrangement on the negative electrode side is similar to the pipe arrangement on the positive electrode side described above. One end of negative electrode upstream pipe 21 has an opening 21t to negative electrode tank 107, which opens at a position close to the liquid level of the negative electrode electrolyte in the negative electrode tank (position greater than (L/2) and less than L from the bottom of negative electrode tank 107, when the distance from the bottom of negative electrode tank 107 to the liquid level of the negative electrode electrolyte in negative electrode tank 107 is represented as L). The other end of negative electrode upstream pipe 21 is an opening 21c to battery element 100c, which is an opening connected to the battery element. An intermediate portion of negative electrode upstream pipe 21 is provided with a low position portion 21L, which is a portion of negative electrode upstream pipe 21 provided at a position lower than the liquid level of the negative electrode electrolyte in negative electrode tank 107 (position lower than opening 21t to the negative electrode tank). Pump 113 is mounted on linear low position portion 21L of negative electrode upstream pipe 21. An accommodated pipe 20A in an inverted L-shape is provided in negative electrode tank 107. An opening at one end of accommodated pipe 20A is connected to opening 21t to the negative electrode tank of negative electrode upstream pipe 21, and an opening (bottom-side opening) 20o at the other end of accommodated pipe 20A is provided at a position close to the bottom of the negative electrode electrolyte in negative electrode tank 107 (position equal to or less than (L/2) from the bottom of negative electrode tank 107, when the distance from the bottom of negative electrode tank 107 to the liquid level of the negative electrode electrolyte in negative electrode tank 107 is represented as L). Furthermore, accommodated pipe 20A is provided with a leakage prevention hole 20h smaller than opening 20o at a position close to the liquid level of the negative electrode electrolyte in negative electrode tank 107 (position greater than (L/2) and less than L from the bottom of negative electrode tank 107, when the distance from the bottom of negative electrode tank 107 to the liquid level of the negative electrode electrolyte in negative electrode tank 107 is represented as L). Accommodated pipe 20A in an inverted L-shape and a portion of negative electrode upstream pipe 21 form an inverted U-shaped pipe. Negative electrode downstream pipe 22 has at one end thereof an opening which opens at space above the negative electrode electrolyte in negative electrode tank 107, and has the other end connected to battery element 100c. The pipe arrangement on the negative electrode side is otherwise similar to the pipe arrangement on the positive electrode side described above, and thus the description thereof will not be repeated.

In FIGS. 1 to 5, the positions where positive electrode upstream pipe 11, positive electrode downstream pipe 12, negative electrode upstream pipe 21 and negative electrode downstream pipe 22 open (positions where pipes 11, 12, 21 and 22 are attached to tanks 106 and 107) are for illustrative purposes only. Although the pipes are shown as having linearly bent shapes in FIGS. 1 to 5, they may have a curved shape, or may be partially inclined without being bent. Furthermore, although the sizes and the positions of the bottoms of positive electrode tank 106 and negative electrode tank 107 are identical to each other in FIGS. 1 to 5, they may be different from each other.

In RF battery 1 in the first embodiment, removal ports for removing the positive electrode electrolyte in positive electrode tank 106 and the negative electrode electrolyte in negative electrode tank 107 (opening 11t to the positive electrode tank of positive electrode upstream pipe 11 and opening 21t to the negative electrode tank of negative electrode upstream pipe 21) are provided close to the liquid levels of the positive electrode electrolyte and negative electrode electrolyte, respectively, and bottom-side openings 10o and 20o of accommodated pipes 10A and 20A provided in positive electrode tank 106 and negative electrode tank 107 are provided in the vicinity of the bottoms of positive electrode tank 106 and negative electrode tank 107, respectively. In RF battery 1 in the first embodiment having this structure, the positive electrode electrolyte on the bottom side of positive electrode tank 106 and the negative electrode electrolyte on the bottom side of negative electrode tank 107 can be supplied to battery element 100c.

In RF battery 1 in the first embodiment, although accommodated pipe 10A in an inverted L-shape and a portion of positive electrode upstream pipe 11 form a an inverted U-shaped pipe, and accommodated pipe 20A in an inverted L-shape and a portion of negative electrode upstream pipe 21 form an inverted U-shaped pipe, accommodated pipes 10A and 20A are provided with leakage prevention holes 10h and 20h close to the liquid levels of the positive electrode electrolyte in positive electrode tank 106 and the negative electrode electrolyte in negative electrode tank 107, respectively. In RF battery 1 in the first embodiment having this structure, even in the event of an accident such as breakage of positive electrode upstream pipe 11, negative electrode upstream pipe 21 and pumps 112, 113, or disconnection between positive electrode upstream pipe 11, negative electrode upstream pipe 21 and battery element 100c, the leakage amount of the positive electrode electrolyte in positive electrode tank 106 and the negative electrode electrolyte in negative electrode tank 107 can be limited to a portion of the electrolytes.

Specifically, a portion of the positive electrode electrolyte in positive electrode tank 106 and the negative electrode electrolyte in negative electrode tank 107 above leakage prevention holes 10h and 20h is, regardless of whether the pumps are being driven or stopped, leaked from positive electrode tank 106 and negative electrode tank 107 through the above-described inverted U-shaped pipes according to the principle of a siphon. Once leakage prevention holes 10h and 20h are exposed at the electrolytes by the leakage of the electrolytes, however, the inverted U-shaped pipes take in gas in positive electrode tank 106 and negative electrode tank 107 and are no longer filled with the electrolytes, causing the movement of the electrolytes to stop automatically. As such, in RF battery 1 in the first embodiment, the leakage amount of the positive electrode electrolyte in positive electrode tank 106 and the negative electrode electrolyte in negative electrode tank 107 can be reduced even in the event of an accident such as described above.

Furthermore, in RF battery 1 in the first embodiment, opening 10o (200) of accommodated pipe 10A (20A) for supplying the electrolyte to battery element 100c and the opening of downstream pipe 12 (22) are located substantially diagonally to each other, ensuring a sufficient distance of movement of the electrolyte in positive electrode tank 106 (negative electrode tank 107). In RF battery 1 in the first embodiment, therefore, the electrolyte that has been sufficiently convected in positive electrode tank 106 (negative electrode tank 107) can be supplied to battery element 100c, thereby increasing the rate of utilization of the electrolyte in positive electrode tank 106 (negative electrode tank 107).

Second Embodiment

Figure 2:
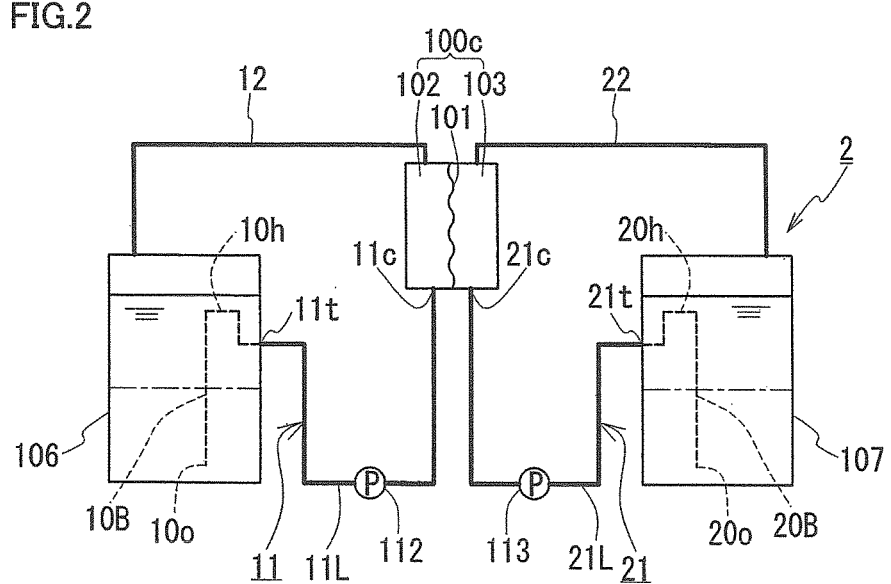
FIG. 2 is a schematic structural diagram of an RF battery in a second embodiment.

FIG. 2 is a schematic structural diagram of an RF battery in a second embodiment. An RF battery 2 in the second embodiment has a basic structure similar to that of RF battery 1 in the first embodiment. Specifically, in RF battery 2 in the second embodiment, pipe arrangements on the positive and negative electrode sides are symmetrical with each other. The removal ports for the electrolytes from positive electrode tank 106 and negative electrode tank 107 (openings 11t and 21t of upstream pipes 11 and 21) are provided at positions close to the liquid levels of the electrolytes in positive electrode tank 106 and negative electrode tank 107, respectively. Positive electrode tank 106 and negative electrode tank 107 include accommodated pipes 10B and 20B provided with leakage prevention holes 10h and 20h, respectively. Upstream pipes 11 and 21 in RF battery 2 in the second embodiment are provided with low position portions 11L and 21L in a portion thereof, respectively. Accommodated pipe 10B and a portion of positive electrode upstream pipe 11 (low position portion 11L) form an inverted U-shaped pipe, and accommodated pipe 20B and a portion of positive electrode upstream pipe 21 (low position portion 21L) form an inverted U-shaped pipe. RF battery 2 in the second embodiment is different from RF battery 1 in the first embodiment in the shape of accommodated pipes 10B and 20B. This difference will be mainly described, and detailed description of the structure and effect the same as those of RF battery 1 in the first embodiment will not be repeated. Moreover, the pipe arrangement on the positive electrode side and the pipe arrangement on the negative electrode side are identical to each other in RF battery 2 in the second embodiment as well, and thus the pipe arrangement on the positive electrode side will be mainly described by way of example.

Accommodated pipe 10B is accommodated in positive electrode tank 106 of RF battery 2. An opening at one end of accommodated pipe 10B opens at a position close to the liquid level of the positive electrode electrolyte in positive electrode tank 106 (position greater than (L/2)), and bottom-side opening 10o at the other end of accommodated pipe 10B opens at a position close to the bottom of positive electrode tank 106 (position equal to or less than (L/2)). Accommodated pipe 10B is provided with leakage prevention hole 10h smaller than opening 10o at a position close to the liquid level of the positive electrode electrolyte in positive electrode tank 106 (position greater than (L/2)).

In RF battery 2 in the second embodiment, accommodated pipe 10B is upwardly convex, and is provided with leakage prevention hole 10h at the highest position from the bottom of positive electrode tank 106 (apex of the convex portion). That is, in RF battery 2, leakage prevention hole 10h is positioned higher than opening 11t to positive electrode tank 106 of positive electrode upstream pipe 11, which serves as the removal port for the positive electrode electrolyte in the positive electrode tank.

The negative electrode side has a similar pipe arrangement. Accommodated pipe 20B is upwardly convex, and is provided with leakage prevention hole 20h at the apex of the convex portion. Leakage prevention hole 20h is positioned higher than opening 21t to the negative electrode tank of negative electrode upstream pipe 21.

In RF battery 2 in the second embodiment, leakage prevention holes 10h and 20h are positioned higher than in RF battery 1 in the first embodiment. Thus, even in the event of an accident such as described above, an amount of the electrolytes leaked until leakage prevention holes 10h and 20h are exposed at the liquid levels of the electrolytes in positive electrode tank 106 and negative electrode tank 107 is lower than in RF battery 1 in the first embodiment. In RF battery 2 in the second embodiment, therefore, the leakage amount of the electrolytes in positive electrode tank 106 and negative electrode tank 107 can be further reduced.

In RF battery 2 in the second embodiment, too, opening 10o (20o) of accommodated pipe 10B (20B) and the opening to positive electrode tank 106 (negative electrode tank 107) of downstream pipe 12 (22) are located substantially diagonally to each other to increase the distance between them, thereby increasing the rate of utilization of the electrolyte in positive electrode tank 106 (negative electrode tank 107).

Third Embodiment

Figure 3:
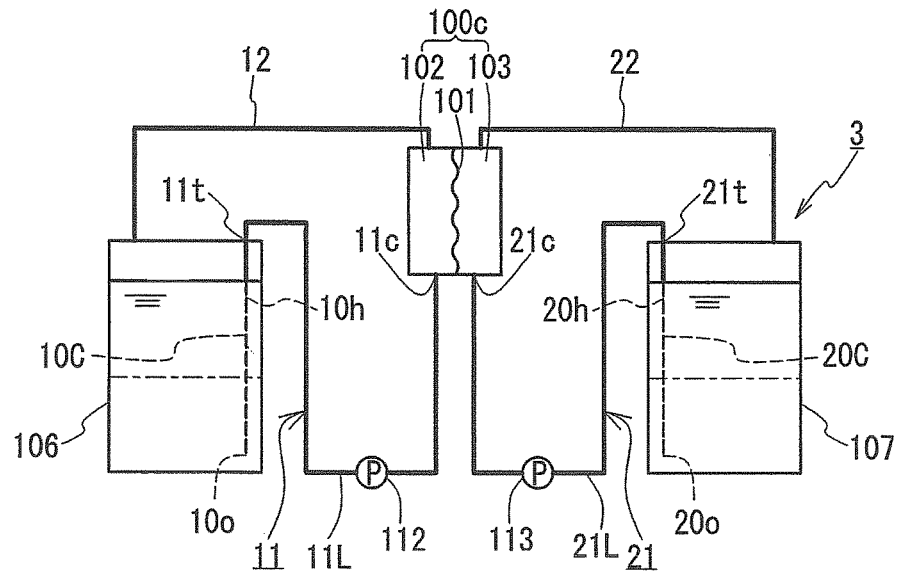
FIG. 3 is a schematic structural diagram of an RF battery in a third embodiment.

FIG. 3 is a schematic structural diagram of an RF battery in a third embodiment. An RF battery 3 in the third embodiment has a basic structure similar to that of RF battery 1 in the first embodiment. RF battery 3 in the third embodiment is different from RF battery 1 in the first embodiment in the position where openings 11t and 21t of upstream pipes 11 and 21 serving as the removal ports for the electrolytes in positive electrode tank 106 and negative electrode tank 107 are provided, and in the shape of accommodated pipes 10C and 20C. This difference will be mainly described, and detailed description of the structure and effect the same as those of RF battery 1 in the first embodiment will not be repeated. Moreover, the pipe arrangement on the positive electrode side and the pipe arrangement on the negative electrode side are identical to each other in RF battery 3 in the third embodiment as well, and thus the pipe arrangement on the positive electrode side will be mainly described by way of example.

In RF battery 3 in the third embodiment, accommodated pipe 10c accommodated in positive electrode tank 106 is linear. One end of accommodated pipe 10c is an opening which opens at a position close to the liquid level of the positive electrode electrolyte in positive electrode tank 106 (position greater than (L/2): space above the liquid level of the positive electrode electrolyte in positive electrode tank 106 in this case). The other end of accommodated pipe 10c is opening 10o which opens at a position close to the bottom of positive electrode tank 106 (position equal to or less than (L/2)). Accommodated pipe 10C is provided with leakage prevention hole 10h smaller than opening 10o at a position close to the liquid level of the positive electrode electrolyte in positive electrode tank 106 (position greater than (L/2)).

In RF battery 3 in the third embodiment, positive electrode upstream pipe 11 is upwardly convex in the vicinity of a portion thereof that is connected to positive electrode tank 106, and this convex portion has one end continuous with low position portion 11L. That is, in RF battery 3 in the third embodiment, leakage prevention hole 10h is positioned lower than opening 11t to the positive electrode tank of positive electrode upstream pipe 11 serving as the removal port for the positive electrode electrolyte.

The negative electrode side has a similar pipe arrangement. One end of linear accommodated pipe 20c is an opening which opens at upper space in negative electrode tank 107, accommodated pipe 20C is provided with leakage prevention hole 20h at a position near the liquid level of the negative electrode electrolyte in negative electrode tank 107, and a portion of negative electrode upstream pipe 21 is upwardly convex. Leakage prevention hole 20h is positioned lower than opening 21t to the negative electrode tank of negative electrode upstream pipe 21.

In RF battery 3 in the third embodiment, the electrolytes on the bottom sides of positive electrode tank 106 and negative electrode tank 107 can be supplied to battery element 100c, while the removal ports for the electrolytes in positive electrode tank 106 and negative electrode tank 107 (openings 11t and 21t) are provided on the upper sides of positive electrode tank 106 and negative electrode tank 107 (above the liquid levels of the electrolytes in positive electrode tank 106 and negative electrode tank 107 in this case), respectively. By utilizing accommodated pipes 10A to 10C and 20A to 20C in this manner, the removal ports for the electrolytes can be positioned as appropriate depending on the space available around positive electrode tank 106 and negative electrode tank 107, to uniformly utilize the electrolytes in positive electrode tank 106 and negative electrode tank 107. Moreover, although RF battery 3 in the third embodiment includes the inverted U-shaped portions formed of accommodated pipes 10C, 20C and portions of upstream pipes 11, 21, the leakage amount of the electrolytes in positive electrode tank 106 and negative electrode tank 107 can be reduced at the time of an accident such as described above, owing to the inclusion of leakage prevention holes 10$h$ and 20$h$.

Fourth Embodiment

Figure 4:
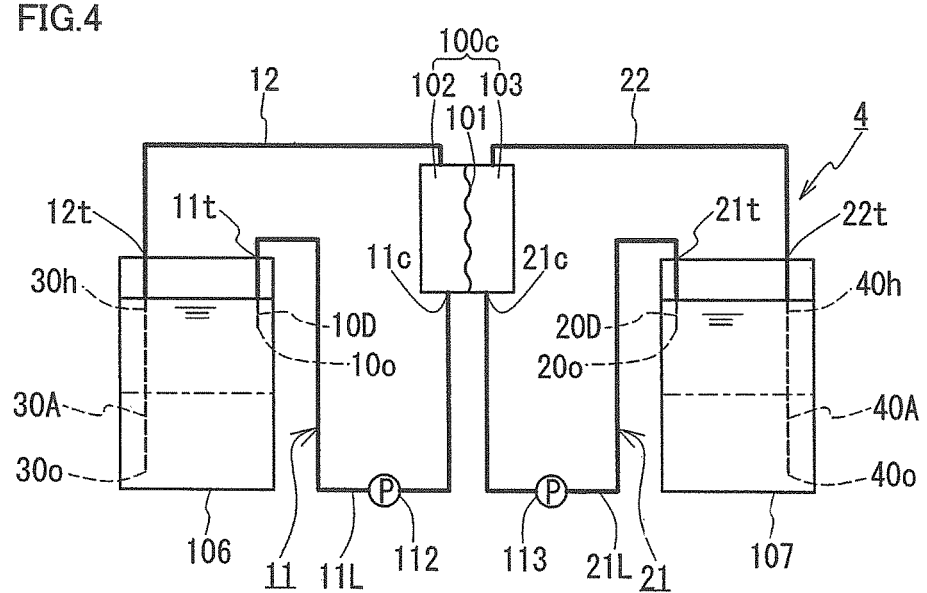
FIG. 4 is a schematic structural diagram of an RF battery in a fourth embodiment.

FIG. 4 is a schematic structural diagram of an RF battery in a fourth embodiment. As with RF batteries 1 to 3 in the first to third embodiments, an RF battery 4 in the fourth embodiment includes accommodated pipes 30A and 40A which open to positions close to the bottoms of positive electrode tank 106 and negative electrode tank 107, respectively. RF battery 4 in the fourth embodiment is different from RF batteries 1 to 3 in the first to third embodiments in that accommodated pipes 30A and 40A are connected to positive electrode downstream pipe 12 and negative electrode downstream pipe 22, respectively. The structure of RF battery 4 in the fourth embodiment is otherwise similar to the structure of RF battery 3 in the third embodiment. Thus, RF battery 4 in the fourth embodiment will be mainly described with regard to this difference, and detailed description of the structure and effect the same as those of RF battery 3 in the third embodiment will not be repeated. A pipe arrangement on the positive electrode side and a pipe arrangement on the negative electrode side are identical to each other in RF battery 4 in the fourth embodiment as well. Thus, the pipe arrangement on the positive electrode side will be mainly described by way of example.

As in the first to third embodiments, one end of positive electrode downstream pipe 12 is an opening which opens at space above the positive electrode electrolyte in positive electrode tank 106, and the other end of positive electrode downstream pipe 12 is attached to battery element 100$c$. Accommodated pipe 30A is linear, as with accommodated pipe 10C in RF battery 3 in the third embodiment. One end of accommodated pipe 30A is connected to an opening 12$t$ of positive electrode downstream pipe 12 provided at a position close to the liquid level of the positive electrode electrolyte in positive electrode tank 106 (position greater than (L/2): space above the liquid level of the positive electrode electrolyte in positive electrode tank 106 in this case). The other end of accommodated pipe 30A is an opening 30$o$ which opens at a position close to the bottom of positive electrode tank 106 (position equal to or less than (L/2)). Accommodated pipe 30A is provided with a leakage prevention hole 30$h$ smaller than opening 30$o$ at a position close to the liquid level of the positive electrode electrolyte in positive electrode tank 106 (position greater than (L/2)).

As with RF battery 3 in the third embodiment, one end of positive electrode upstream pipe 11 is opening 11$t$ which opens at upper space in positive electrode tank 106. The other end of positive electrode upstream pipe 11 is opening 11$c$ which is attached to battery element 100$c$. An intermediate portion of positive electrode upstream pipe 11 is provided with low position portion 11L. Opening 11$t$ at the one end of positive electrode upstream pipe 11 is connected to another accommodated pipe 10D. One end of accommodated pipe 10D is opening 10$o$ which opens into the positive electrode electrolyte in positive electrode tank 106. Accommodated pipe 10D has a length shorter than that of accommodated pipe 30A connected to positive electrode downstream pipe 12, and opening 10$o$ of accommodated pipe 10D is provided at a position close to the liquid level of the positive electrode electrolyte in positive electrode tank 106. Accordingly, opening 30$o$ of accommodated pipe 30A connected to positive electrode downstream pipe 12 and opening 10$o$ of short accommodated pipe 10D connected to positive electrode upstream pipe 11 are located substantially diagonally to each other in the rectangular shape of the positive electrode electrolyte in positive electrode tank 106.

Accommodated pipe 30A, positive electrode downstream pipe 12, battery element 100$c$, and a portion (portion including low position portion 11L) of positive electrode upstream pipe 11 are provided to form an inverted U-shape.

A pipe arrangement on the negative electrode side is similar to the pipe arrangement on the positive electrode side described above. An opening 22$t$ to the negative electrode tank of negative electrode downstream pipe 22 is connected to one end of linear accommodated pipe 40A. An opening 40$o$ at the other end of accommodated pipe 40A is provided at a position close to the bottom of negative electrode tank 107. Accommodated pipe 40A is provided with a leakage prevention hole 40$h$ smaller than opening 40$o$ at a position close to the liquid level of the negative electrode electrolyte in negative electrode tank 107. Opening 21$t$ to the negative electrode tank of negative electrode upstream pipe 21 is connected to a short accommodated pipe 20D, and opening 20$o$ at the other end of accommodated pipe 20D is provided at a position close to the liquid level of the negative electrode electrolyte in negative electrode tank 107. Negative electrode upstream pipe 21 includes low position portion 21L. Accommodated pipe 40A, negative electrode downstream pipe 22, battery element 100$c$, and a portion (portion including low position portion 21L) of negative electrode upstream pipe 21 are provided to form an inverted U-shape.

Both of the removal ports for the electrolytes from positive electrode tank 106 and negative electrode tank 107 (openings 11$t$ and 21$t$) and the return ports for the electrolytes from battery element 100$c$ (openings 12$t$ and 22$t$) in RF battery 4 in the fourth embodiment are provided on the upper sides of positive electrode tank 106 and negative electrode tank 107 (above the liquid levels of the electrolytes in positive electrode tank 106 and negative electrode tank 107 in this case), respectively. RF battery 4 in the fourth embodiment, however, can supply the electrolytes on the liquid level side in positive electrode tank 106 and negative electrode tank 107 to battery element 100$c$, and can return the electrolytes from battery element 100$c$ to the bottom sides of positive electrode tank 106 and negative electrode tank 107, respectively, owing to the inclusion of accommodated pipes 10D, 20D, 30A and 40A. Moreover, although RF battery 4 in the fourth embodiment includes the inverted U-shaped portions formed of accommodated pipes 30A, 40A and portions of the electrolyte flow paths provided outside of positive electrode tank 106 and negative electrode tank 107 (downstream pipes 12, 22; battery element 100$c$; upstream pipes 11, 21), the leakage amount of the electrolytes in positive electrode tank 106 and negative electrode tank 107 can be reduced at the time of an accident such as described above, owing to the inclusion of leakage prevention holes 30$h$ and 40$h$.

Fifth Embodiment

Figure 5:
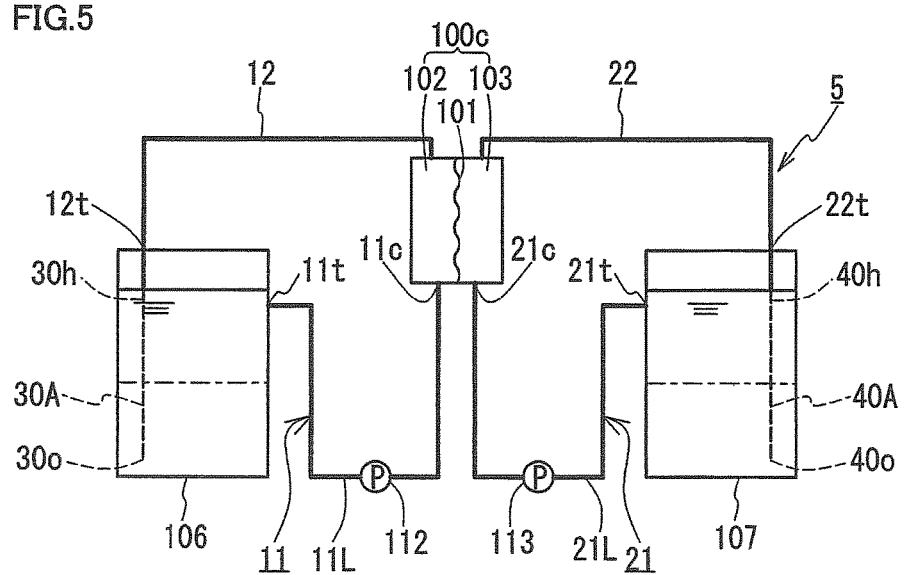
FIG. 5 is a schematic structural diagram of an RF battery in a fifth embodiment.
Figure 6:
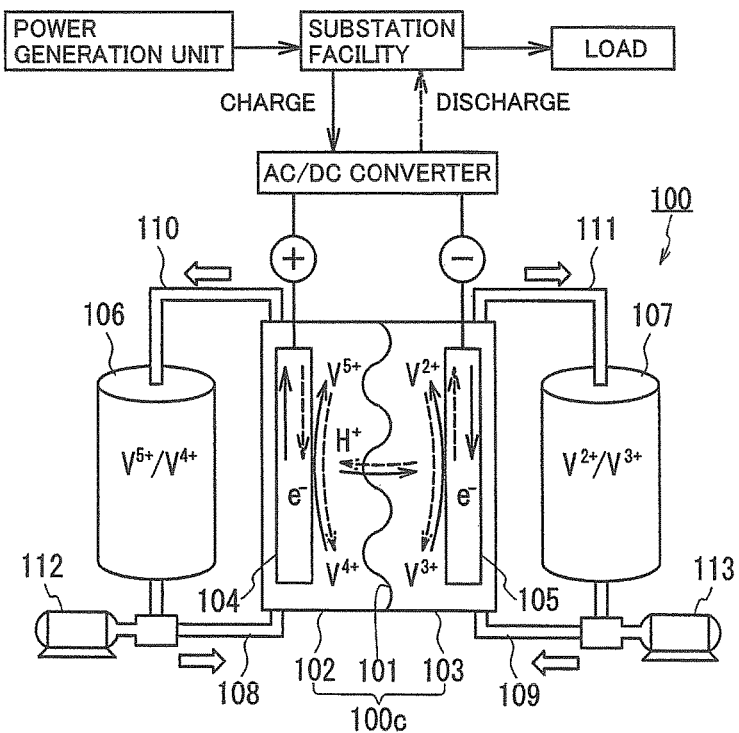
FIG. 6 is an illustration diagram showing the principle of operation of a conventional RF battery disclosed in Patent Document 1.

FIG. 5 is a schematic structural diagram of an RF battery in a fifth embodiment. In an RF battery 5 in the fifth embodiment, at one end of upstream pipe 11 (21), opening 11t (21t) which opens at a position close to the liquid level of the positive electrode electrolyte (negative electrode electrolyte) in positive electrode tank 106 (negative electrode tank 107) (position greater than (L/2) and less than L) is not connected to an accommodated pipe. RF battery 5 in the fifth embodiment has a smaller number of accommodated pipes, thus allowing for a reduction in the number of components and assembly steps. RF battery 5 in the fifth embodiment has a basic structure similar to that of RF battery 4 in the fourth embodiment (except that the shape of upstream pipe 11 (21) is similar to that of RF battery 1 in the first embodiment), and thus the description thereof will not be repeated.

<First Variation>

While the pipe arrangements on the positive and negative electrode sides were described as being symmetrical with each other in the above first to fifth embodiments, the pipe arrangements may be different between both electrodes. For example, one of the positive and negative electrodes may not include an accommodate pipe, or one of the positive and negative electrodes may have the pipe arrangement in the first embodiment and the other electrode may have the pipe arrangement in the second embodiment.

<Second Variation>

While battery element 100c was described as being provided at a position equal to or higher than the liquid levels of the electrolytes in positive electrode tank 106 and negative electrode tank 107 in the above first to fifth embodiments, battery element 100c may be provided at a different position. For example, battery element 100c may be provided at a position substantially equal to the bottoms of positive electrode tank 106 and negative electrode tank 107 (such as a floor surface). More specifically, in the examples shown in FIGS. 1 to 5, battery element 100c may be connected to the ends of the linear portions of positive electrode upstream pipe 11 and negative electrode upstream pipe 21 where pumps 112 and 113 are mounted, respectively. In this form, the mount that supports battery element 100c is unnecessary.

The present invention is not limited to the above-described embodiments but can be modified as appropriate without deviation from the gist of the present invention. For example, the low position portion provided on the upstream pipe and the like is only required to be provided at a position lower than the liquid level in the tank connected to the upstream pipe and the like, and does not have to include a portion provided on the surface floor. The low position portion may be provided on an appropriate mount surface provided on the surface floor.

Although the embodiments and variations of the present invention have been described above, it is originally intended to combine the features of the above-described embodiments and variations together as appropriate.

It should be understood that the embodiments and variations disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The redox flow battery according to the present invention can be suitably used as a large-capacity storage battery for stabilizing variations in power generation output, storing surplus generated power, and load leveling for power generation of new energy such as solar photovoltaic power generation and wind power generation. The redox flow battery according to the present invention can also be suitably used as a large-capacity storage battery installed in a common power plant or factory for momentary voltage drop and power failure prevention and for load leveling.

REFERENCE SIGNS LIST 1, 2, 3, 4, 5, 100 redox flow battery; 10A, 10B, 10C, 10D, 30A accommodated pipe; 10h, 30h leakage prevention hole; 10o, 30o opening; 11 positive electrode upstream pipe; 11t, 12t opening to positive electrode tank; 11c opening to battery element; 11L low position portion; 12 positive electrode downstream pipe; 20A, 20B, 20C, 20D, 40A accommodated pipe; 20h, 40h leakage prevention hole; 20o, 40o opening; 21 negative electrode upstream pipe; 21t, 22t opening to negative electrode tank; 21c opening to battery element; 21L low position portion; 22 negative electrode downstream pipe; 100c battery element; 101 membrane; 102 positive electrode cell; 103 negative electrode cell; 104 positive electrode; 105 negative electrode; 106 positive electrode tank; 107 negative electrode tank; 108, 109 upstream pipe; 110, 111 downstream pipe; 112, 113 pump.

The invention claimed is:

1. A redox flow battery charged and discharged by supply of an electrolyte in a tank to a battery element, comprising:
   an upstream pipe for supplying the electrolyte in said tank to said battery element;
   a downstream pipe for returning the electrolyte from said battery element to said tank; and
   an accommodated pipe provided in said tank and connected to said upstream pipe or said downstream pipe,
   a portion of an electrolyte flow path formed of said upstream pipe, said battery element and said downstream pipe being a low position portion provided at a position lower than a liquid level of the electrolyte in said tank,
   one end of said upstream pipe or said downstream pipe connected to one end of said accommodated pipe opening at a position close to the liquid level or at space above said liquid level of the electrolyte in said tank,
   the other end of said accommodated pipe opening at a position close to the bottom of said tank,
   said accommodated pipe being provided with a leakage prevention hole at a position close to the liquid level of the electrolyte in said tank,
   said leakage prevention hole being smaller than an opening at the other end of said accommodated pipe,
   when a diameter of said leakage prevention hole is represented as $\phi h$, and a diameter of the opening at the other end of said accommodated pipe is represented as $\phi i$, diameter $\phi h$ of said leakage prevention hole is not less than 1 mm and less than ($\phi i/2$),
   said low position portion, provided at the position lower than the liquid level of the electrolyte in said tank, is located outside said tank.

2. The redox flow battery according to claim 1, wherein the one end of said accommodated pipe is connected to said upstream pipe, and
   said upstream pipe is provided with said low position portion in a portion thereof.

3. The redox flow battery according to claim 2, wherein the one end of said downstream pipe opens at the position close to the liquid level or at space above said liquid level of the electrolyte in said tank.

4. The redox flow battery according to claim 1, wherein the one end of said accommodated pipe is connected to said downstream pipe, and
said upstream pipe is provided with said low position portion in a portion thereof.

5. The redox flow battery according to claim 4, wherein the one end of said upstream pipe opens at space above said liquid level and is connected to another accommodated pipe opening into the electrolyte in said tank, or opens at the position close to the liquid level of the electrolyte in said tank.

6. The redox flow battery according to claim 1, wherein said leakage prevention hole is for reducing a leakage amount of said electrolyte in said tank.

* * * * *